United States Patent [19]
Canzek

[11] 4,398,809
[45] Aug. 16, 1983

[54] HIGH SPEED CATADIOPTRIC SYSTEM

[76] Inventor: Ludvik Canzek, Quellmattstrasse 3, 5035 Unterentfelden, Switzerland

[21] Appl. No.: 280,244

[22] Filed: Jul. 6, 1981

[30] Foreign Application Priority Data

Aug. 16, 1980 [CH] Switzerland ............ 6155/80

[51] Int. Cl.³ ............................................. G02B 17/08
[52] U.S. Cl. ................................................... 350/444
[58] Field of Search ........................................ 350/444

[56] References Cited

U.S. PATENT DOCUMENTS

| 3,711,184 | 1/1973 | Amon et al. | 350/444 |
| 4,061,420 | 12/1977 | Kaprelian et al. | 350/444 X |
| 4,165,151 | 8/1979 | Momiyama | 350/444 |
| 4,264,136 | 4/1981 | Ogino | 350/444 |

FOREIGN PATENT DOCUMENTS

2647 6/1979 European Pat. Off. ............ 350/444

*Primary Examiner*—John K. Corbin
*Assistant Examiner*—Scott J. Sugarman
*Attorney, Agent, or Firm*—Werner W. Kleeman

[57] ABSTRACT

This invention provides a high speed catadioptric system of F/1.2. The lens system comprises, in accordance with the advance of the light rays, a front lens, a main mirror lens, a counter mirror surfaced to the central portion of the front lens, and a field lens system. The field lens system is composed of the unsilvered central portion of the main mirror lens and additional lenses immediately adjacent to the main mirror lens at its object- and image side. The same glass is used for the front lens and the main mirror lens. This glass is light, cheap and rather resistant to chemical attack. Three preferred embodiments present a rather high state of correction for the wavelength range from 400 nm to 1000 nm, providing a high contrast image with good detectability of poor-contrast objects. Such lens systems, in spite of their good performance, are of rather simple construction bringing about a lower price of manufacture than known systems. The new lenses are useful also for systems used at low light level employing image intensifier tubes of the 1st, 2nd and 3rd generation.

11 Claims, 3 Drawing Figures

Fig. 1
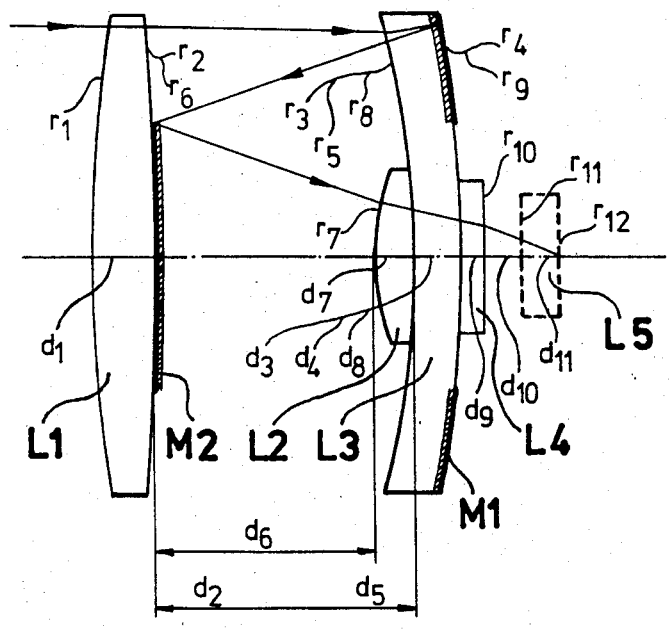
Fig. 2
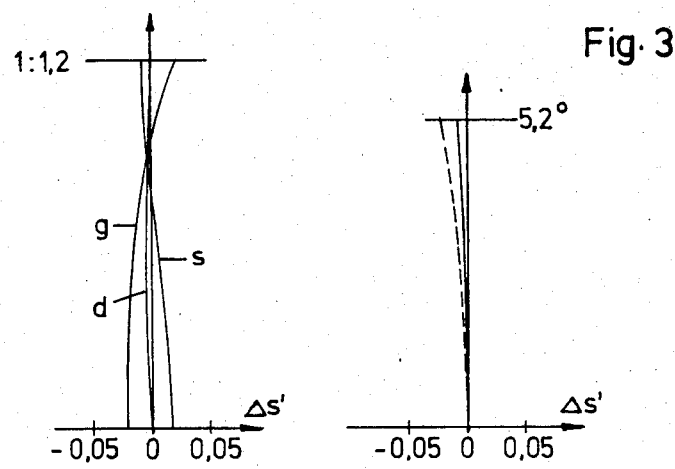
f = 100
$\lambda_g$ = 436 nm
$\lambda_d$ = 588 nm
$\lambda_s$ = 852 nm
Fig. 3
f = 100
----- mer.
——— sag.

HIGH SPEED CATADIOPTRIC SYSTEM

BACKGROUND OF THE INVENTION

1. Field of the Invention

This invention relates to an improved high speed catadioptric system with a front lens, a main mirror lens with an unsilvered central portion, a counter mirror and a field lens system.

2. Description of the Prior Art

High speed catadioptric systems with spherical faces are known. These systems, with only rare exceptions, are variations of the Mandler-type and have two or more front lenses, a Cassegrain mirror system and a field lens system. Such an objective is disclosed in F. I. Havlicek, L. Canzek: "Zum Korrigieren von Spiegelobjectiven", Deutsche Geodätische Kommission bei der Bayerischen Akademie der Wissenschaften, Reihe A, Heft 42, München 1963. Another embodiment with a relative aperture of 1:1.2 is shown in German DE-Patent 2 222 864. A large drawback of this lens type is the great zonal error of spheric aberration.

A high speed mirror lens with good correction of the zonal error of spherical aberration is made known by Swiss CH-Patent 542 454 and by L. Canzek: "Lichtstarkes katadioptrisches Objektiv", Optica Acta, No. 12, 1971 and No. 4, 1972. This lens consists of only one front lens with its silvered central back portion effective as counter mirror, a centrally bored main mirror lens and a field lens system. The system focus is within the objective, impeding general use.

Finally, four objective lenses of such type are presented in L. Canzek: "Neue Richtung in der Entwicklung der katadioptrischen Objektive", Optica Acta, No. 2, 1979 and described in the inventor's co-pending application Ser. No. 967,973, filed Dec. 8, 1978 now U.S. Pat. No. 4,273,425. With these systems the relative aperture is 1:1.2 but the focus is placed out of the objective. They present the state of the art most nearly connected with the present application. The first two embodiments of these four are constructed most simply. They consist of one front lens and one main mirror lens. A mirror layer evaporated on the central back portion of the front lens is effective as counter mirror, and the unsilvered central portion of the main mirror lens is left without a bore. This central portion is dioptrically effective and carries one or two field lenses on its object side.

Great disadvantages of these objectives reside in the fact that high refractive index glasses SF 3 and respectively SF 55 or LaF 23 must be used for the big optical elements, i.e. for the front lens and the main mirror lens. Moreover, the front lens and main mirror lens must be manufactured from different types of glass. The well known advantages of high refractive index glasses for the correction of aberrations are in contrast to the drawbacks, namely low resistance to chemical attack, high specific gravity and a high cost. Lens manufacture from such glass is complicated and costly. Although high refractive index glasses are available where the said drawbacks are less pronounced, these glasses have a reduced transparency for the small wavelength (shortwave) part of the visible spectrum. But this spectral range is rather important for its use in optoelectronics, photography and for visual devices.

More suitable glasses are provided for the front lens and the main mirror lens of two other embodiments from the above application. But this is brought about by a more expensive construction for these objectives have an additional medium sized lens arranged near to the counter mirror. Moreover the large sized optical elements are still made from different types of glass. The advantage of the more suitable glasses is thus counterbalanced by a more complicated and expensive construction.

There are also known optical systems with a field lens system consisting of the central portion of the main mirror lens and lenses immediately adjacent on its object and image side. The effect of the lens in front of the main mirror lens as well as that of the overall field system is divergent, whereas the lens on the image side is convergent. These objective lenses likewise are of a rather expensive construction and have a very low aperture ratio. For instance, embodiments according to U.S. Pat. No. 3,490,831 with an aperture ratio of 1:10 comprise a two component front lens and a medium sized lens at the counter mirror. On the other hand objectives according to U.S. Pat. No. 4,165,151 with an aperture ratio of 1:7 comprise only a single front lens, but an additional lens and a glass carrier for the mirror are inserted at the counter mirror, i.e. two medium size additional optical elements.

SUMMARY OF THE PRESENT INVENTION

One object of this invention is to provide a high speed catadioptric system with great focal length and those lenses distant from the focus being made of the same type of glass in order to essentially eliminate the primary and secondary spectra and to make possible chromatic correction for a broad spectral range.

Another object is to provide such an objective lens with simple construction and the same glass for the front and main mirror lens being less heavy, less expensive and above all more resistant to chemical attack than with known lens systems. The lens performance and in particular image forming properties should be at the same time at least as good as with known objectives.

The optical system of this invention comprises, in accordance with the advance of the light rays a front lens, a main mirror lens, a counter mirror surface to the central portion of the front lens and a field lens system. The field lens system is composed of the dioptrically effective central portion of the main mirror lens and of lenses immediately adjacent to said central portion, both on the object and on the image side. The lens on the object side as well as the whole field lens system is convergent, whereas the image side component is divergent. The present invention will be described more in detail with reference to illustrative embodiments shown in the accompanying drawings.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 illustrates a schematic cross section of an embodiment of the present invention;

FIG. 2 shows the spherical aberration of an objective according to claim 3 of the present invention for the spectral lines d ($\lambda=588$ nm), g ($\lambda=436$ nm) and s ($\lambda=852$ nm); and FIG. 3 shows the astigmatism of an objective according to claim 3 of the present invention.

DETAILED DESCRIPTION OF THE PREFERRED EMBODIMENTS

Examples 1, 2 and 3 are shown in the following tables and will be described with reference to FIG. 1. F is the speed of the system, f is the focal length and s' is the back focal distance.

EXAMPLE 1

| | F = 1:1.2 | f = 99.558 | s' = 9.722 | |
|---|---|---|---|---|
| | Radius | Thickness | $n_d$ | $v_d$ |
| $L_1$ | $r_1 = 258.418$ | $d_1 = 6$ | 1.54814 | 45.8 |
| | $r_2 = -2818.489$ | $d_2 = 43$ | | |
| $M_1$ | $r_3 = -140.076$ | $d_3 = 8$ | 1.54814 | 45.8 |
| | $r_4 = -220.868$ | $d_4 = d_3$ | 1.54814 | 45.8 |
| | $r_5 = r_3$ | $d_5 = d_2$ | | |
| $M_2$ | $r_6 = r_2$ | $d_6 = 38$ | | |
| $L_2$ | $r_7 = 39.963$ | $d_7 = 5$ | 1.46450 | 67.3 |
| | $r_8 = r_3$ | $d_8 = d_3$ | | |
| $L_3$ | $r_8 = r_3$ | $d_8 = d_3$ | 1.54814 | 45.8 |
| | $r_9 = r_4$ | | | |
| $L_4$ | $r_9 = r_4$ | $d_9 = 2$ | 1.84666 | 23.8 |
| | $r_{10} = -333.333$ | | | |

EXAMPLE 2

| | F = 1:1.2 | f = 99.834 | s' = 9.855 | |
|---|---|---|---|---|
| | Radius | Thickness | $n_d$ | $v_d$ |
| $L_1$ | $r_1 = 252.742$ | $d_1 = 6$ | 1.54814 | 45.8 |
| | $r_2 = -3615.329$ | $d_2 = 43$ | | |
| $M_1$ | $r_3 = -140.131$ | $d_3 = 8$ | 1.54814 | 45.8 |
| | $r_4 = -222.158$ | $d_4 = d_3$ | 1.54814 | 45.8 |
| | $r_5 = r_3$ | $d_5 = d_2$ | | |
| $M_2$ | $r_6 = r_2$ | $d_6 = 38$ | | |
| $L_2$ | $r_7 = 40.895$ | $d_7 = 5$ | 1.48450 | 67.3 |
| | $r_8 = r_3$ | $d_8 = d_3$ | | |
| $L_3$ | $r_8 = r_3$ | $d_8 = d_3$ | 1.54814 | 45.8 |
| | $r_9 = r_4$ | | | |
| $L_4$ | $r_9 = r_4$ | $d_9 = 2$ | 1.59551 | 39.2 |
| | $r_{10} = -513.875$ | | | |

EXAMPLE 3

| | F = 1:1.2 | f = 99.723 | s' = 0 | |
|---|---|---|---|---|
| | Radius | Thickness | $n_d$ | $v_d$ |
| $L_1$ | $r_1 = 251.458$ | $d_1 = 7$ | 1.54814 | 45.8 |
| | $r_2 = -16077.170$ | $d_2 = 44$ | | |
| $M_1$ | $r_3 = -148.447$ | $d_3 = 8$ | 1.54814 | 45.8 |
| | $r_4 = -231.310$ | $d_4 = d_3$ | 1.54814 | 45.8 |
| | $r_5 = r_3$ | $d_5 = d_2$ | | |
| $M_2$ | $r_6 = r_2$ | $d_6 = 39$ | | |
| $L_2$ | $r_7 = 40.614$ | $d_7 = 5$ | 1.48450 | 67.3 |
| | $r_8 = r_3$ | $d_8 = d_3$ | | |
| $L_3$ | $r_8 = r_3$ | $d_8 = d_3$ | 1.54814 | 45.8 |
| | $r_9 = r_4$ | | | |
| $L_4$ | $r_9 = r_4$ | $d_9 = 2$ | 1.84666 | 23.8 |
| | $r_{10} = -310.907$ | $d_{10} = 6.025$ | | |
| $L_5$ | $r_{11} = \infty$ | $d_{11} = 5.6$ | 1.48748 | 70.4 |
| | $r_{12} = \infty$ | | | |

All three examples each consist of a front lens $L_1$, a main mirror lens $M_1$, a counter mirror $M_2$ surfaced to the central portion of the front lens and a field lens system $L_2$, $L_3$, $L_4$. The field lens system is composed of the unslivered central portion $L_3$ of the main mirror lens and additional lenses $L_2$ and $L_4$ adjacent to the main mirror lens respectively on its object and image side. The lenses in front and behind of the main mirror lens may be arranged each with a separate mount, but not necessarily so; they are advantageously cemented to the main mirror lens, as shown in FIG. 1. The said lenses may each comprise several components, but single elements are also sufficient, as shown in FIG. 1.

According to the invention the lens $L_2$ in front of the main mirror lens $M_1$ as well as the field lens system as a whole must be convergent in order to provide a good image quality even off axis.

Catadioptric systems of this kind are mostly used in optoelectronics and in particular for night vision systems in conjunction with image intensifier or image converter tubes. The image intensifier tube of the third generation is distinguished over those of the first and second generation by its spectral sensitivity being shifted to the infrared range and by a cover glass being inserted in front of the cathode instead of the usual fiber plate (see I. P. Csorba: "Recent Advancements In The Field Of Image Intensification: The Generation 3 Wafer Tube", Applied Optics, No. 14, 1979).

Objectives according to the present invention may be modified, as known in the art, for use with the cover glass. Such an embodiment is given by the above Example 3 and shown in FIG. 1 by the glass $L_5$ of thickness $d_{11}$ in dashed representation. But this embodiment may be used with intensifier tubes of all three generations, the only necessary modification for use with generation 1 and 2 tubes being to replace the cover glass by a plane plate of corresponding thickness.

For the front and main mirror lens of Example 1, 2 and 3 glass of type LLF 1 is used. The following table gives a comparison of the most important physical and chemical properties of glass types LLF 1 and SF 3, SF 55 as well as LaF 23:

| Glass Type (Schott) | LLF 1 | SF 3 | SF 55 | LaF 23 |
|---|---|---|---|---|
| Index of refraction $n_d$ | 1.5481 | 1.74 | 1.7618 | 1.689 |
| Specific gravity (g · cm$^{-3}$) | 2.94 | 4.64 | 4.72 | 4.21 |
| Resistance to change of climate (class) | 1 | 1 | 1 | 3 |
| Stain affectability (class) | 0 | 2 | 2 | 2 |
| Acid resistance (class) | 1 | 5a | 3 | 5b |
| Transmission for thickness d = 25 mm and $\lambda$ = 400 nm | 0.99 | 0.86 | 0.76 | 0.90 |

Glass of type LLF 1 may be replaced by another type of approximately equal suitability (e.g. K 7, LF 7 etc.) or front and main mirror lens may be made of two different glasses (for use with a more narrow spectral range), without changing the fundamental optical concept of the invention. Objective system lenses according to the present invention may also be manufactured from material suited for use within the UV or IR spectral range.

Examples 1, 2 and 3 are distinguised over the state of the art by shape and rule of combination of the convergent and divergent elements of the field lens system $L_2$, $L_3$, $L_4$, which has got a fundamentally new layout characteristic for the present invention. Only this novel approach has brought about fulfillment of the objects of the invention.

It has been found that such objectives allow a very simple manufacture, the same glass being suitable for the front lens $L_1$ and the main mirror lens $M_1$, whereby the above mentioned deficiencies of known systems are substantially reduced or altogether eliminated. Nevertheless the new lenses have an excellent image quality with concurrent large relative aperture ratio. Objective systems calculated according to the present invention may be corrected for use within the complete wavelength range from 400 nm to 1000 nm.

Optical calculations for Examples 1, 2 and 3, in spite of the simple construction give a remarkable quality of performance, such that the aperture ratio may be even raised above 1:1.2, the focal length may be extended with unchanged speed, or both together without essentially deteriorating image quality. This is due to the elevated state of correction of chromatic aberration and of zonal spherical aberration as well as due to the anastigmatically flattened image field.

Finally, a surprising success has been brought about by a seemingly minute modification introduced at the appropriate spot of a system known as such.

It will be appreciated that various modifications and changes of the preferred embodiments described above may be made without leaving the scope of the invention as defined in the accompanying claims. ACCORDINGLY,

What I claim is:

1. A high speed catadioptric system comprising in the order of the transmission of a regular light ray:
   a first single positive lens ($L_1$);
   a main mirror lens ($M_1$) with an unsilvered central portion;
   a counter mirror ($M_2$);
   a convergent lens system ($L_2$);
   a lens ($L_3$) consisting of the unsilvered central portion of the main mirror ($M_1$) and
   a divergent lens system ($L_4$), wherein:
   the system consisting of said convergent lens system ($L_2$), said lens ($L_3$) and said divergent lens system ($L_4$) is of positive refractive power, and
   said first single positive lens ($L_1$) and said main mirror lens ($M_1$) consist of the same type of glass.

2. A high speed catadioptric system according to claim 1, wherein, the entrance pupil diameter EPD and the distance $d_2$ between said first single positive lens ($L_1$) and said main mirror lens ($M_1$) fulfill the following condition:

$$d_2 < 0.55 \text{ EPD}.$$

3. A high speed catadioptric system with a first single front lens ($L_1$), a main mirror lens ($M_1$) with an unsilvered central portion ($L_3$), a counter mirror ($M_2$) and a field lens system ($L_2$, $L_3$, $L_4$), comprising a field lens system composed of the dioptrically effective central portion ($L_3$) of the main mirror lens and lenses ($L_2$, $L_4$) immediately adjacent to said central portion ($L_3$) on the object side and on the image side, the field lens system being convergent, wherein the elements of the system referred to have the following numerical values:

|  | $F = 1:1.2$ | $f = 99.558$ | $s' = 9.722$ |  |
|---|---|---|---|---|
|  | Radius | Thickness | $n_d$ | $v_d$ |
| $L_1$ | $r_1 = 258.418$ | $d_1 = 6$ | 1.54814 | 45.8 |
|  | $r_2 = -2818.489$ | $d_2 = 43$ |  |  |
| $M_1$ | $r_3 = -140.076$ | $d_3 = 8$ | 1.54814 | 45.8 |
|  | $r_4 = -220.868$ | $d_4 = d_3$ | 1.54814 | 45.8 |
|  | $r_5 = r_3$ | $d_5 = d_2$ |  |  |
| $M_2$ | $r_6 = r_2$ | $d_6 = 38$ |  |  |
| $L_2$ | $r_7 = 39.963$ | $d_7 = 5$ | 1.46450 | 67.3 |
|  | $r_8 = r_3$ | $d_8 = d_3$ |  |  |
| $L_3$ | $r_8 = r_3$ | $d_8 = d_3$ | 1.54814 | 45.8 |
|  | $r_9 = r_4$ |  |  |  |
| $L_4$ | $r_9 = r_4$ | $d_9 = 2$ | 1.84666 | 23.8 |
|  | $r_{10} = -333.333$ |  |  |  | where F is the speed of the system, f is the focal length of the system, s' is the back focal distance.

4. A high speed catadioptric system with a first single front lens ($L_1$), a main mirror lens ($M_1$) with an unsilvered central portion ($L_3$), a counter mirror ($M_2$) and a field lens system ($L_2$, $L_3$, $L_4$), comprising a field lens system composed of the dioptrically effective central portion ($L_3$) of the main mirror lens and lenses ($L_2$, $L_4$) immediately adjacent to said central portion ($L_3$) on the object side and on the image side, the field lens system being convergent, wherein the elements of the system referred to have the following numerical values:

|  | $F = 1:1.2$ | $f = 99.834$ | $s' = 9.855$ |  |
|---|---|---|---|---|
|  | Radius | Thickness | $n_d$ | $v_d$ |
| $L_1$ | $r_1 = 252.742$ | $d_1 = 6$ | 1.54814 | 45.8 |
|  | $r_2 = -3615.329$ | $d_2 = 43$ |  |  |
| $M_1$ | $r_3 = -140.131$ | $d_3 = 8$ | 1.54814 | 45.8 |
|  | $r_4 = -222.158$ | $d_4 = d_3$ | 1.54814 | 45.8 |
|  | $r_5 = r_3$ | $d_5 = d_2$ |  |  |
| $M_2$ | $r_6 = r_2$ | $d_6 = 38$ |  |  |
| $L_2$ | $r_7 = 40.895$ | $d_7 = 5$ | 1.48450 | 67.3 |
|  | $r_8 = r_3$ | $d_8 = d_3$ |  |  |
| $L_3$ | $r_8 = r_3$ | $d_8 = d_3$ | 1.54814 | 45.8 |
|  | $r_9 = r_4$ |  |  |  |
| $L_4$ | $r_9 = r_4$ | $d_9 = 2$ | 1.59551 | 39.2 |
|  | $r_{10} = -513.875$ |  |  |  | where F is the speed of the system, f is the focal length of the system, s' is the back focal distance.

5. A high speed catadioptric system with a first single front lens ($L_1$), a main mirror lens ($M_1$) with an unsilvered central portion ($L_3$), a counter mirror ($M_2$) and a field lens system ($L_2$, $L_3$, $L_4$), comprising a field lens system containing three optical members ($L_1$; $L_2$, $L_3$, $L_4$; $L_5$) and composed of the dioptrically effective central portion ($L_3$) of the main mirror lens and lenses ($L_2$, $L_4$) immediately adjacent to said central portion ($L_3$) on the object side and on the image side, the field lens system being convergent, wherein the elements of the system referred to have the following numerical values:

|  | $F = 1:1.2$ | $f = 99.723$ | $s' = 0$ |  |
|---|---|---|---|---|
|  | Radius | Thickness | $n_d$ | $v_d$ |
| $L_1$ | $r_1 = 251.458$ | $d_1 = 7$ | 1.54814 | 45.8 |
|  | $r_2 = -16077.170$ | $d_2 = 44$ |  |  |
| $M_1$ | $r_3 = -148.447$ | $d_3 = 8$ | 1.54814 | 45.8 |
|  | $r_4 = -231.310$ | $d_4 = d_3$ | 1.54814 | 45.8 |
|  | $r_5 = r_3$ | $d_5 = d_2$ |  |  |
| $M_2$ | $r_6 = r_2$ | $d_6 = 39$ |  |  |
| $L_2$ | $r_7 = 40.614$ | $d_7 = 5$ | 1.48450 | 67.3 |
|  | $r_8 = r_3$ | $d_8 = d_3$ |  |  |
| $L_3$ | $r_8 = r_3$ | $d_8 = d_3$ | 1.54814 | 45.8 |
|  | $r_9 = r_4$ |  |  |  |
| $L_4$ | $r_9 = r_4$ | $d_9 = 2$ | 1.84666 | 23.8 |
|  | $r_{10} = -310.907$ | $d_{10} = 6.025$ |  |  |
| $L_5$ | $r_{11} = \infty$ | $d_{11} = 5.6$ | 1.48748 | 70.4 |
|  | $r_{12} = \infty$ |  |  |  | where F is the speed of the system, f is the focal length of the system, s' is the back focal distance and $L_5$ is a plane plate.

6. A high speed catadioptric system with a first single front lens ($L_1$), a main mirror lens ($M_1$) with an unsilvered central portion ($L_3$), a counter mirror ($M_2$) and a field lens system ($L_2$, $L_3$, $L_4$), comprising a field lens system composed of the dioptrically effective central portion ($L_3$) of the main mirror lens and lenses ($L_2$, $L_4$) immediately adjacent to said central portion ($L_3$) on the object side and on the image side, the field lens system being convergent, a field lens system ($L_2$, $L_3$, $L_4$) with at least one lens ($L_4$) immediately adjacent to said central portion ($L_3$) of the main mirror lens ($M_1$) on the image side, the component ($L_4$) on the image side being divergent, wherein the elements of the system referred to have the following numerical values:

| | $F = 1:1.2$ | $f = 99.558$ | $s' = 9.722$ | |
|---|---|---|---|---|
| | Radius | Thickness | $n_d$ | $v_d$ |
| $L_1$ | $r_1 = 258.418$ | $d_1 = 6$ | 1.54814 | 45.8 |
| | $r_2 = -2818.489$ | $d_2 = 43$ | | |
| $M_1$ | $r_3 = -140.076$ | $d_3 = 8$ | 1.54814 | 45.8 |
| | $r_4 = -220.868$ | $d_4 = d_3$ | 1.54814 | 45.8 |
| | $r_5 = r_3$ | $d_5 = d_2$ | | |
| $M_2$ | $r_6 = r_2$ | $d_6 = 38$ | | |
| $L_2$ | $r_7 = 39.963$ | $d_7 = 5$ | 1.46450 | 67.3 |
| | $r_8 = r_3$ | $d_8 = d_3$ | | |
| $L_3$ | $r_8 = r_3$ | $d_8 = d_3$ | 1.54814 | 45.8 |
| | $r_9 = r_4$ | | | |
| $L_4$ | $r_9 = r_4$ | $d_9 = 2$ | 1.84666 | 23.8 |
| | $r_{10} = -333.333$ | | | | where F is the speed of the system, f is the focal length of the system, s' is the back focal distance.

7. A high speed catadioptric system with a first single front lens ($L_1$), a main mirror lens ($M_1$) with an unsilvered central portion ($L_3$), a counter mirror ($M_2$) and a field lens system ($L_2$, $L_3$, $L_4$), comprising a field lens system composed of the dioptrically effective central portion ($L_3$) of the main mirror lens and lenses ($L_2$, $L_4$) immediately adjacent to said central portion ($L_3$) on the object side and on the image side, the field lens system being convergent, a field lens system ($L_2$, $L_3$, $L_4$) with at least one lens ($L_4$) immediately adjacent to said central portion ($L_3$) of the main mirror lens ($M_1$) on the image side, the component ($L_4$) on the image side being divergent, wherein the elements of the system referred to have the following numerical values:

| | $F = 1:1.2$ | $f = 99.834$ | $s' = 9.855$ | |
|---|---|---|---|---|
| | Radius | Thickness | $n_d$ | $v_d$ |
| $L_1$ | $r_1 = 252.742$ | $d_1 = 6$ | 1.54814 | 45.8 |
| | $r_2 = -3615.329$ | $d_2 = 43$ | | |
| $M_1$ | $r_3 = -140.131$ | $d_3 = 8$ | 1.54814 | 45.8 |
| | $r_4 = -222.158$ | $d_4 = d_3$ | 1.54814 | 45.8 |
| | $r_5 = r_3$ | $d_5 = d_2$ | | |
| $M_2$ | $r_6 = r_2$ | $d_6 = 38$ | | |
| $L_2$ | $r_7 = 40.895$ | $d_7 = 5$ | 1.48450 | 67.3 |
| | $r_8 = r_3$ | $d_8 = d_3$ | | |
| $L_3$ | $r_8 = r_3$ | $d_8 = d_3$ | 1.54814 | 45.8 |
| | $r_9 = r_4$ | | | |
| $L_4$ | $r_9 = r_4$ | $d_9 = 2$ | 1.59551 | 39.2 |
| | $r_{10} = -513.875$ | | | | where F is the speed of the system, f is the focal length of the system, s' is the back focal distance.

8. A high speed catadioptric system with a first single front lens ($L_1$), a main mirror lens ($M_1$) with an unsilvered central portion ($L_3$), a counter mirror ($M_2$) and a field lens system ($L_2$, $L_3$, $L_4$), comprising a field lens system composed of the dioptrically effective central portion ($L_3$) of the main mirror lens and lenses ($L_2$, $L_4$) immediately adjacent to said central portion ($L_3$) on the object side and on the image side, the field lens system being convergent, a field lens system ($L_2$, $L_3$, $L_4$) with at least one lens ($L_4$) immediately adjacent to said central portion ($L_3$) of the main mirror lens ($M_1$) on the image side, the component ($L_4$) on the image side being divergent, wherein the elements of the system referred to have the following numerical values:

| | $F = 1:1.2$ | $f = 99.723$ | $s' = 0$ | |
|---|---|---|---|---|
| | Radius | Thickness | $n_d$ | $v_d$ |
| $L_1$ | $r_1 = 251.458$ | $d_1 = 7$ | 1.54814 | 45.8 |
| | $r_2 = -16077.170$ | $d_2 = 44$ | | |
| $M_1$ | $r_3 = -148.447$ | $d_3 = 8$ | 1.54814 | 45.8 |
| | $r_4 = -231.310$ | $d_4 = d_3$ | 1.54814 | 45.8 |
| | $r_5 = r_3$ | $d_5 = d_2$ | | |
| $M_2$ | $r_6 = r_2$ | $d_6 = 39$ | | |
| $L_2$ | $r_7 = 40.614$ | $d_7 = 5$ | 1.48450 | 67.3 |
| | $r_8 = r_3$ | $d_8 = d_3$ | | |
| $L_3$ | $r_8 = r_3$ | $d_8 = d_3$ | 1.54814 | 45.8 |
| | $r_9 = r_4$ | | | |
| $L_4$ | $r_9 = r_4$ | $d_9 = 2$ | 1.84666 | 23.8 |
| | $r_{10} = -310.907$ | $d_{10} = 6.025$ | | |
| $L_5$ | $r_{11} = \infty$ | $d_{11} = 5.6$ | 1.48748 | 70.4 |
| | $r_{12} = \infty$ | | | | where F is the speed of the system, f is the focal length of the system, s' is the back focal distance and $L_5$ is a plane plate.

9. A high speed catadioptric system with a first single front lens ($L_1$), a main mirror lens ($M_1$) with an unsilvered central portion ($L_3$), a counter mirror ($M_2$) and a field lens system ($L_2$, $L_3$, $L_4$), comprising a field lens system composed of the dioptrically effective central portion ($L_3$) of the main mirror lens and lenses ($L_2$, $L_4$) immediately adjacent to said central portion ($L_3$) on the object side and on the image side, the field lens system being convergent, a field lens system ($L_2$, $L_3$, $L_4$) with at least one lens ($L_2$) immediately adjacent to said central portion ($L_3$) of the main mirror lens ($M_1$) on the object side, the component ($L_2$) on the object side being convergent, wherein the elements of the system referred to have the following numerical values:

| | $F = 1:1.2$ | $f = 99.558$ | $s' = 9.722$ | |
|---|---|---|---|---|
| | Radius | Thickness | $n_d$ | $v_d$ |
| $L_1$ | $r_1 = 258.418$ | $d_1 = 6$ | 1.54814 | 45.8 |
| | $r_2 = -2818.489$ | $d_2 = 43$ | | |
| $M_1$ | $r_3 = -140.076$ | $d_3 = 8$ | 1.54814 | 45.8 |
| | $r_4 = -220.868$ | $d_4 = d_3$ | 1.54814 | 45.8 |
| | $r_5 = r_3$ | $d_5 = d_2$ | | |
| $M_2$ | $r_6 = r_2$ | $d_6 = 38$ | | |
| $L_2$ | $r_7 = 39.963$ | $d_7 = 5$ | 1.46450 | 67.3 |
| | $r_8 = r_3$ | $d_8 = d_3$ | | |
| $L_3$ | $r_8 = r_3$ | $d_8 = d_3$ | 1.54814 | 45.8 |
| | $r_9 = r_4$ | | | |
| $L_4$ | $r_9 = r_4$ | $d_9 = 2$ | 1.84666 | 23.8 |
| | $r_{10} = -333.333$ | | | | where F is the speed of the system, f is the focal length of the system, s' is the back focal distance.

10. A high speed catadioptric system with a first single front lens ($L_1$), a main mirror lens ($M_1$) with an unsilvered central portion ($L_3$), a counter mirror ($M_2$) and a field lens system ($L_2$, $L_3$, $L_4$), comprising a field lens system composed of the dioptrically effective central portion ($L_3$) of the main mirror lens and lenses ($L_2$, $L_4$) immediately adjacent to said central portion ($L_3$) on the object side and on the image side, the field lens system being convergent, a field lens system ($L_2$, $L_3$, $L_4$) with at least one lens ($L_2$) immediately adjacent to said central portion ($L_3$) of the main mirror lens ($M_1$) on the object side, the component ($L_2$) on the object side being convergent, wherein the elements of the system referred to have the following numerical values:

| | F = 1:1.2 | f = 99.834 | s' = 9.855 | |
|---|---|---|---|---|
| | Radius | Thickness | $n_d$ | $v_d$ |
| $L_1$ | $r_1 = 252.742$ | $d_1 = 6$ | 1.54814 | 45.8 |
| | $r_2 = -3615.329$ | $d_2 = 43$ | | |
| $M_1$ | $r_3 = -140.131$ | $d_3 = 8$ | 1.54814 | 45.8 |
| | $r_4 = -222.158$ | $d_4 = d_3$ | 1.54814 | 45.8 |
| | $r_5 = r_3$ | $d_5 = d_2$ | | |
| $M_2$ | $r_6 = r_2$ | $d_6 = 38$ | | |
| $L_2$ | $r_7 = 40.895$ | $d_7 = 5$ | 1.48450 | 67.3 |
| | $r_8 = r_3$ | $d_8 = d_3$ | | |
| $L_3$ | $r_8 = r_3$ | $d_8 = d_3$ | 1.54814 | 45.8 |
| | $r_9 = r_4$ | | | |
| $L_4$ | $r_9 = r_4$ | $d_9 = 2$ | 1.59551 | 39.2 |
| | $r_{10} = -513.875$ | | | | where F is the speed of the system, f is the focal length of the system, s' is the back focal distance.

11. A high speed catadioptric system with a first single front lens ($L_1$), a main mirror lens ($M_1$) with an unsilvered central portion ($L_3$), a counter mirror ($M_2$) and a field lens system ($L_2$, $L_3$, $L_4$), comprising a field lens system containing three optical members ($L_1$; $L_2$,$L_3$,$L_4$; $L_5$) and composed of the dioptrically effective central portion ($L_3$) of the main mirror lens and lenses ($L_2$, $L_4$) immediately adjacent to said central portion ($L_3$) on the object side and on the image side, the field lens system being convergent, a field lens system ($L_2$, $L_3$, $L_4$) with at least one lens ($L_2$) immediately adjacent to said central portion ($L_3$) of the main mirror lens ($M_1$) on the object side, the component ($L_2$) on the object side being convergent, wherein the elements of the system referred to have the following numerical values:

| | F = 1:1.2 | f = 99.723 | s' = 0 | |
|---|---|---|---|---|
| | Radius | Thickness | $n_d$ | $v_d$ |
| $L_1$ | $r_1 = 251.458$ | $d_1 = 7$ | 1.54814 | 45.8 |
| | $r_2 = -16077.170$ | $d_2 = 44$ | | |
| $M_1$ | $r_3 = -148.447$ | $d_3 = 8$ | 1.54814 | 45.8 |
| | $r_4 = -231.310$ | $d_4 = d_3$ | 1.54814 | 45.8 |
| | $r_5 = r_3$ | $d_5 = d_2$ | | |
| $M_2$ | $r_6 = r_2$ | $d_6 = 39$ | | |
| $L_2$ | $r_7 = 40.614$ | $d_7 = 5$ | 1.48450 | 67.3 |
| | $r_8 = r_3$ | $d_8 = d_3$ | | |
| $L_3$ | $r_8 = r_3$ | $d_8 = d_3$ | 1.54814 | 45.8 |
| | $r_9 = r_4$ | | | |
| $L_4$ | $r_9 = r_4$ | $d_9 = 2$ | 1.84666 | 23.8 |
| | $r_{10} = -310.907$ | $d_{10} = 6.025$ | | |
| $L_5$ | $r_{11} = \infty$ | $d_{11} = 5.6$ | 1.48748 | 70.4 |
| | $r_{12} = \infty$ | | | | where F is the speed of the system, f is the focal length of the system, s' is the back focal distance and $L_5$ is a plane plate.

* * * * *